(12) United States Patent
Zang et al.

(10) Patent No.: US 10,990,544 B2
(45) Date of Patent: Apr. 27, 2021

(54) PCIE ROOT COMPLEX MESSAGE INTERRUPT GENERATION METHOD USING ENDPOINT

(71) Applicant: NXP USA, Inc., Austin, TX (US)

(72) Inventors: Tiefei Zang, Austin, TX (US); Mingkai Hu, Beijing (CN); Gang Liu, Suzhou (CN); Minghuan Lian, Beijing (CN)

(73) Assignee: NXP USA, Inc., Austin, TX (US)

( * ) Notice: Subject to any disclaimer, the term of this patent is extended or adjusted under 35 U.S.C. 154(b) by 13 days.

(21) Appl. No.: 16/421,719

(22) Filed: May 24, 2019

(65) Prior Publication Data

US 2020/0356503 A1 Nov. 12, 2020

(30) Foreign Application Priority Data

May 10, 2019 (CN) .......................... 201910392376.4

(51) Int. Cl.
G06F 13/24 (2006.01)
G06F 13/28 (2006.01)
G06F 13/42 (2006.01)

(52) U.S. Cl.
CPC .............. *G06F 13/24* (2013.01); *G06F 13/28* (2013.01); *G06F 13/4282* (2013.01); *G06F 2213/0026* (2013.01)

(58) Field of Classification Search
CPC .......... G06F 13/00; G06F 13/24; G06F 13/28; G06F 13/4282; G06F 2213/0026
USPC ............. 710/260–269, 240–244, 4–5, 20–22
See application file for complete search history.

(56) References Cited

U.S. PATENT DOCUMENTS

| 8,468,284 B2 | 6/2013 | Brice, Jr. et al. |
| 2014/0108869 A1* | 4/2014 | Brewerton .......... G06F 11/1048 714/42 |
| 2020/0226450 A1* | 7/2020 | Guntoro ................... G06N 3/04 |

FOREIGN PATENT DOCUMENTS

CN 106951388 A 7/2017

OTHER PUBLICATIONS

Rota, Lorenzo, et al; "A PCIe DMA Architecture for Multi-Gigabyte Per Second Data Transmission"; Published in IEEE Transactions on Nuclear Science, vol. 62, Issue 3; May 21, 2015; pp. 972-976.

\* cited by examiner

*Primary Examiner* — Tim T Vo
*Assistant Examiner* — Kim T Huynh

(57) ABSTRACT

A method and apparatus for generating a message interrupt. In one embodiment, the method includes writing a predefined data pattern to a predetermined source location in a memory system. One or more first data blocks are also stored in the memory system at one or more first locations, respectively. After storing the one or more first data blocks at the one or more first source locations, creating a first data structure that comprises one or more first source addresses mapped to one or more first destination addresses, respectively, and a predetermined source address mapped to a predetermined destination address, wherein the one or more first source addresses correspond to the one or more first source locations, respectively, and wherein the predetermined source address corresponds to a predetermined source location. The first data structure can be used by a DMA controller to transfer data stored at the one or more first storage locations and to transfer the predetermined data.

18 Claims, 7 Drawing Sheets

PCIE ROOT COMPLEX MESSAGE INTERRUPT GENERATION METHOD USING ENDPOINT

BACKGROUND

A CPU can transfer data. But some CPUs cannot perform other functions while it is transferring data. Direct memory access (DMA) is a method for transferring data independent of a CPU, which allows the CPU to perform other functions at the same time. At the end of a DMA data transfer the CPU is informed by interruption so that the CPU can perform a function related to the data transfer. The interruption can be generated by an interrupt controller.

BRIEF DESCRIPTION OF THE DRAWINGS

The present technology may be better understood, and its numerous objects, features, and advantages made apparent to those skilled in the art by referencing the accompanying drawings.

DETAILED DESCRIPTION

Disclosed is an apparatus and method for reducing interrupts associated with DMA data transfers. In the following description, various embodiments will be described. For purposes of explanation, specific configurations and details are set forth in order to provide a thorough understanding of the embodiments. However, it will also be apparent to one skilled in the art that the embodiments may be practiced without the specific details described herein. Furthermore, well-known features may be omitted or simplified in order not to obscure the embodiment being described.

Figure 1:
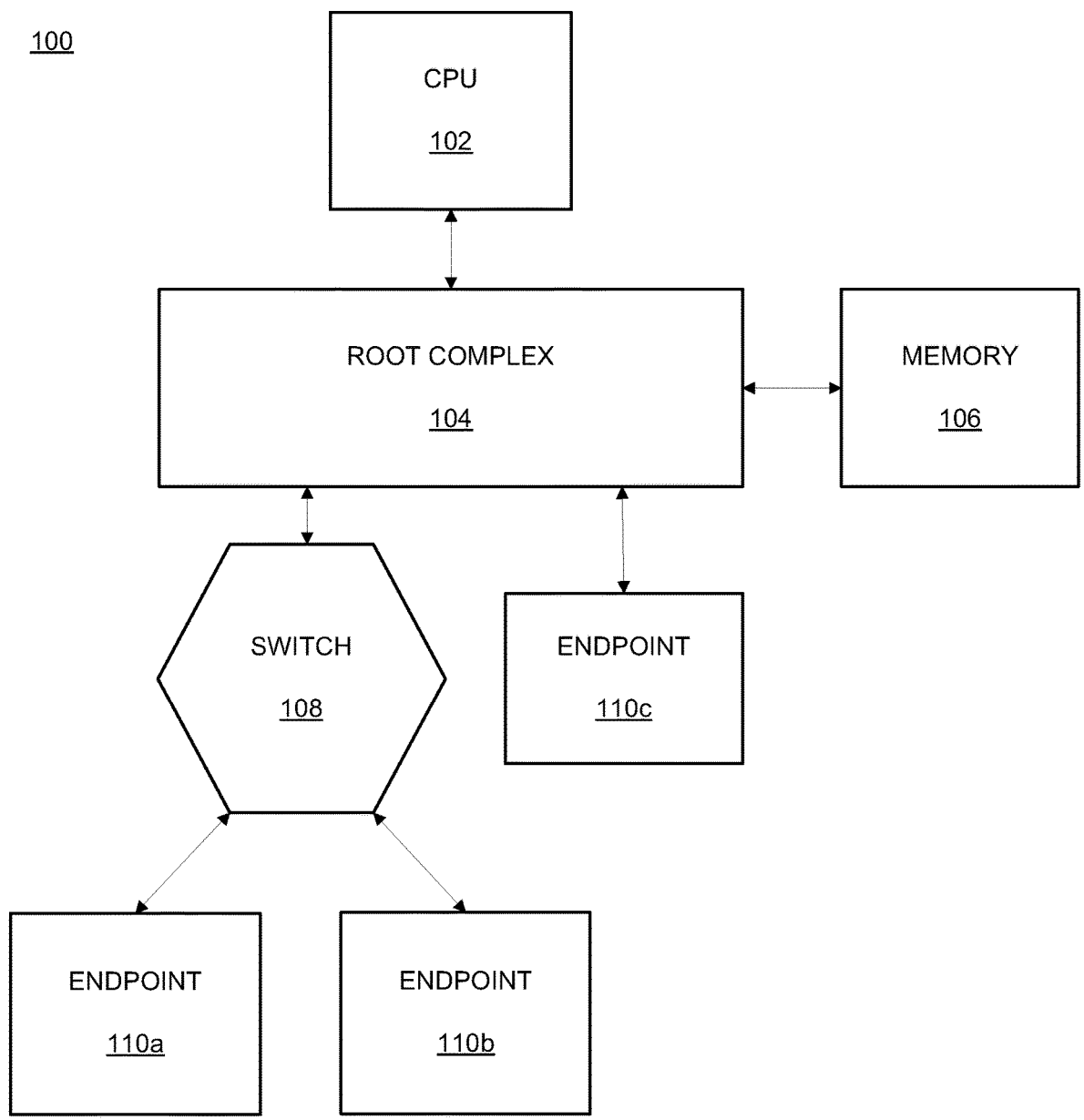
FIG. 1 illustrates an example computer system with PCIe subsystem.

In certain systems, data is transferred from one central processing unit (CPU) based subsystem to another CPU based subsystem. FIG. 1 illustrates an example system in which data is transferred from one CPU based subsystem to another CPU based subsystem. More particularly, FIG. 1 illustrates an example of a Peripheral Component Interconnect express (PCIe) based system 100 that includes a root complex 104, a switch 106 and a number of endpoint devices 110 interconnected through PCIe communication links. In the illustrated example as will be more fully described below, root complex 104 and endpoint device 110c contain respective CPUs. While the present disclosure will be described with reference to data transfer between an endpoint device and a root complex of a PCIe system, the present disclosure should not be limited thereto.

The PCIe protocol is an extension to PCI protocol and has been used with servers, personal computers (PC), communication systems, industrial applications, etc. PCIe uses a packet-based layered protocol, and is based on point-to-point topology, with separate serial links connecting endpoint devices to a root complex. A root complex is a device that connects a computer system to endpoint devices. Typically only one root complex is provided in a PCIe based system. The root complex is similar to a north-bridge in a PCI based system. A root complex may include one or more root ports, one or more CPUs, an interrupt controller, RAM, one or more memory controllers, one or more PCIe controllers, etc. Root complex 104 may be a hardware device or a combination of hardware and software. Many of the various components of a root complex may be formed on a single semiconductor die.

Endpoint devices are configured to communicate using the PCIe protocol. Endpoint devices take many forms. An intelligent PCIe add-in card is one example of an endpoint device. Endpoints devices are requesters or completers of PCIe transactions. Endpoints initiate transactions as a requester or respond to transactions as a completer. An endpoint device terminates a PCIe link. An endpoint device only has one connection to the PCIe system topology, but may have a connection to another kind of bus. An endpoint device may include one or more ports, one or more CPUs, an interrupt controller, RAM, one or more memory controllers, one or more PCIe controllers, one or more DMA controllers, etc. These various components of an endpoint device may be formed on a single semiconductor die. Endpoint devices can be connected directly or indirectly to a root complex. In FIG. 1 endpoint device 110c is connected directly to root complex 104. Endpoint devices 110a and 110b are indirectly connected to root complex 104 through switch 106. For purposes of explanation endpoint device 110c takes form in an intelligent PCIe add-in card that connects to a network (e.g., Ethernet, Wi-Fi, etc., not shown).

A PCIe switch is a device that connects two or more PCIe links. Switch 106 in FIG. 1 functions as a multi-port connecter between various devices, including root complex 104, endpoint devices 110a and 110b, and possibly other switches and bridges. Switch 106 may route transactions between any of the devices connected to it. For example, switch 106 may route transactions between endpoints 110a and 110b, and root complex 104. Switch 106 may also provide arbitration to prioritize incoming and outgoing transactions. Devices connected to switch 106 may treat switch 106 as another requester and/or completer. Though not illustrated here, switches can also be connected to other switches to further expand the number of peripheral devices that can be connected to computing system 100.

Endpoint device transactions may involve data transfer. For example, with respect to FIG. 1, endpoint device 110c may receive data in its local memory from an external network device (not shown in FIG. 1). Thereafter, endpoint device 110c may initiate a transaction to transfer the data to root complex 104 for storage.

Endpoint devices can use direct memory access (DMA) to transfer data to root complex 104. DMA is a feature in which a subsystem (e.g., a DMA controller) transfers data independently of a CPU. DMA enables the CPU to work concurrently on another task while DMA controller implements a long lasting data transfer to or from memory, which in turn considerably boosts overall system performance.

In some embodiments, DMA permits data transfer directly with memory without each data portion (e.g., byte or word) of the transfer being handled by the CPU. The concept of directly accessing memory without CPU interaction, is employed in many different subsystems including intelligent PCIe add-in cards and disk drive controllers.

DMA enables efficient "memory-to-memory" transfer, which is where data is transferred within one memory system or between separate memory systems. In the simplest form of memory-to-memory transfer, a CPU programs a DMA controller by configuring data transfer control registers with a source address, a destination address, a data length, a direction of data transfer, etc., for data to be transferred. Once programmed, the CPU tells the DMA controller to start. The DMA controller in one embodiment implements successive read/write cycles. During a read portion of a cycle the DMA controller puts the source address and a read signal on address and control buses, respectively. A memory system uses the source address to access the data in question. The DMA controller receives data specified by the source address from the memory system via the data bus. During a write the DMA controller puts the destination address, the data just received, and a write signal on address, data, and control buses, respectively. After the data is written to the memory system or another memory system, the DMA controller increments the source and destination addresses, and a byte counter by 1. If the value in the byte counter does not equal the data length in the data length register, the DMA controller repeats the process with the incremented source and destination addresses in the source and destination address registers, respectively. Otherwise, the memory-to-memory transfer is complete. After the CPU programs and starts the DMA controller, the CPU can then forget about the data transfer until the DMA controller directly or indirectly (via an interrupt controller) generates an interrupt signal indicating the transfer is complete.

The foregoing description of memory-to-memory transfer has a drawback, however, in that it assumes that the data to be transferred is contained in a contiguous block of memory or data is to be written to a contiguous block of memory. However data is most likely scattered around memory in non-contiguous blocks. So it would be advantageous if DMA transfer could work with data that is distributed in non-contiguous memory blocks.

Scatter/gather DMA supports the transfer of non-contiguous memory blocks of data. Scatter/gather DMA can be used in a memory-to-memory transfer in which data from a plurality of non-contiguous blocks in one memory can be copied to a plurality of non-contiguous blocks, respectively, in a separate memory. Before the scatter/gather DMA transfer can start, the CPU may create a chained DMA descriptor list of elements, each of which corresponds to a respective block of data to be transferred. Each element may include a header, a source address, and a destination address. Each header may include a data transfer length for a respective block of data to be transferred, a flag to indicate whether the element is the last element of the chained DMA descriptor list, a pointer to the next DMA descriptor in the list, etc. Each source address identifies a starting address of a block of data, and each destination address identifies the address where the block of data is to be transferred. The elements of a chained DMA descriptor list may be scattered in memory. A pointer in a header of one descriptor list element can point to the start of a non-contiguous, next element of the list.

A CPU can program a DMA controller to implement a scatter/gather data transfer. Once programmed, the DMA controller can start the scatter/gather data transfer. Data control registers (i.e., source address register, destination address register, data length register, etc.) are programmed with values (i.e., source address, destination address, data transfer length, etc.) from the first element of the chained DMA descriptor list. Once the control registers are programmed, the DMA controller transfers data using consecutive read/write cycles. During a read portion of a cycle the DMA controller puts the source address and a read signal on address and control buses, respectively. The DMA controller then receives data from the memory system via the data bus. During a write portion of the cycle the DMA controller puts the destination address, the data just received, and a write signal on address, data, and control buses, respectively. After the data is written to the memory system or another memory system, the DMA controller increments the source address in the source address register, the destination address in the destination address register, and a byte counter by 1. If the value in the byte counter does not equal the data transfer length, the DMA controller repeats the process with the incremented source and destination addresses. Otherwise, the data transfer control registers of the DMA controller are reprogrammed according to the next DMA descriptor in the chained list. In one embodiment, the data control registers of the DMA controller can be updated automatically without CPU intervention. The main advantage of the scatter/gather DMA is that the plurality of non-contiguous-block transfers can occur one after the other with no intervention by the CPU.

Figure 2:
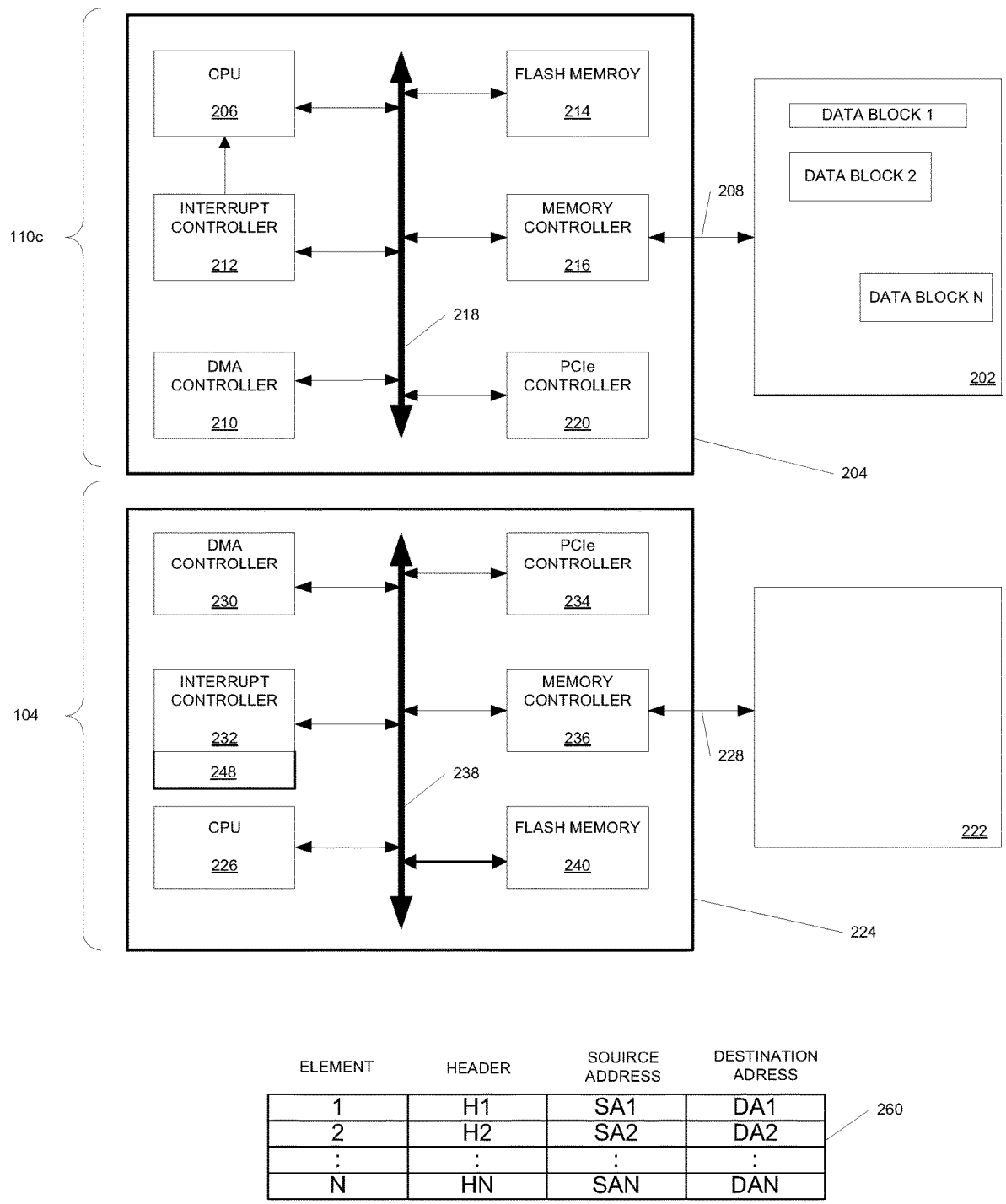
FIG. 2 illustrates relevant components of the computer system shown in FIG. 1.

Endpoint devices 110 are capable of scatter/gather transfer of data to memory of root complex 104. The present disclosure will be described with reference to a scatter/gather DMA transfer of non-contiguous blocks of data, it being understood the present disclosure should not be limited thereto. Endpoint device 110c can implement a scatter/gather DMA transfer of non-contiguous blocks of data from its local memory to non-contiguous locations in memory of root complex 102. FIG. 2 shows relevant components of endpoint device 110c and root complex 104 that enables scatter/gather DMA data transfer in more detail.

With continuing reference to FIG. 1, endpoint device 110c in FIG. 2 includes local random-access memory system 202 in data communication with a circuit 204 (e.g., a microcontroller, a system on chip, etc.) that includes CPU 206, DMA controller 210, interrupt controller 212, flash memory 214, memory controller 216, communication system 218, and PCIe controller 220. In one embodiment, circuit 204 is implemented on an integrated circuit separate from RAM 204 and circuit 104, but at least some components may be located on the same integrated circuit in other embodiments. Memory controller 216 manages data transactions to and from memory system 202 via data link 208. For example, memory controller 216 can access memory 202 and read data at an address specified by DMA controller 210. Communication system 218 may include one or more address buses, one or more data buses, one more control buses, bus management circuits, etc., that enable data communication between the components shown.

CPU 206 executes instructions stored in flash memory 214. Interrupt controller 212, as its name implies, generates interrupts in response to respective events. An interrupt is a signal or message sent to a CPU (e.g., CPU 206) indicating an event has occurred that needs immediate attention. For example, the DMA controller 210 may generate an interrupt when a data transfer from endpoint device 110c to root complex 104 has completed. An interrupt alerts the CPU to a high-priority condition that may require the interruption of the current code the CPU is executing. The CPU can respond by suspending its current activities, saving its state, and executing a function called an interrupt handler (or an interrupt service routine ISR) to deal with the event. For example, in response to receiving an interrupt signal from interrupt controller 212 that a DMA data transfer is complete, CPU 206 can suspend its current activities to execute a function stored in flash memory 214, and send a message to root complex 104 via PCIe link 250, which indicates a data transfer is complete. The CPU interruption is temporary, and after the interrupt handler finishes, the CPU can resume the activity that was interrupted. However the interruption and subsequent resumption of CPU activities, is time-consuming and disruptive to CPU efficiency.

In one embodiment, root complex 104 includes circuit 224 (e.g., a microcontroller, a system on chip, etc.) in data communication with random-access memory system 222 via data link 228. As shown in FIG. 2, integrated circuit 224 includes a CPU 226, flash memory 240, a DMA controller 230, an interrupt controller 232, a PCIe controller 234, a memory controller 236, and communication system 238, which may include one or more address buses, one or more data buses, one or more control buses, one or more bus control management systems, etc. Memory controller 236 manages data transactions to and from memory system 222 via data link 228. For example memory controller 236 can write data received via PCIe link 250 to memory 222 at an address directly or indirectly specified by PCIe controller 220. Interrupt controller 232 generates interrupts in response to respective events. For example, interrupt controller 232 can notify CPU 226 upon completion of a data transfer into memory system 222. Interrupt controller 232 may include one or more registers, including register 248, into which dedicated messages can be written and detected. For example, as will be more fully described below, CPU 206 can write a fixed pattern message "End of DMA Transfer (EDT)" to register 248, via PCIe controllers 220 and 234 upon completion of a DMA transfer of data from memory system 202 to memory system 222 via PCIe link 250. Interrupt controller 232 in turn generates an interrupt signal in response to the "End of DMA Transfer" message written to register 248. The interrupt signal prompts CPU 226 to initiate an interrupt routine. It should be noted, however, that the act of the CPU 206 writing the "End of DMA Transfer" message into the register of interrupt controller 232, places a processing burden on CPU 206 that adversely affects its performance and efficiency.

Endpoint device 110c and root complex 104 are in data communication with each other via PCIe link 250 and PCIe controllers 220 and 234. A PCIe link supports full-duplex communication between endpoint devices and a root complex. Data can flow upstream and downstream simultaneously. A PCIe link may include 1 to 32 lanes. PCIe uses a packet-based layered protocol, including a transaction layer, a data link layer, and a physical layer. PCIe enables DMA transfer between endpoint 110c and root complex 104.

FIG. 2 shows endpoint memory system 202 containing N noncontiguous data blocks that were received from a device external to the system shown within FIG. 1. Endpoint device 110c can copy these data blocks to root complex memory system 222 using scatter/gather DMA transfer via PCIe link 250. Before this transfer can take place, CPU 206, executing instructions stored within flash memory 214, creates a chained DMA descriptor list. This list includes N elements corresponding to the N data blocks to be transferred to memory system 222. FIG. 2 illustrates an example DMA descriptor list created by CPU 206 and stored within memory 202. DMA descriptor list 260 includes N elements, each of which includes a header, a source address, and a destination address. Each header includes a data length for a respective data block, a flag indicating whether the element is the last of the DMA descriptor in the list. Additionally, each header includes a pointer P to the next element in the list if the element is not the last. Each source address corresponds to a starting location within memory system 202 where a block can be found, and each destination address corresponds to a starting location within memory system 222 where a data block is to be copied.

Figure 3:
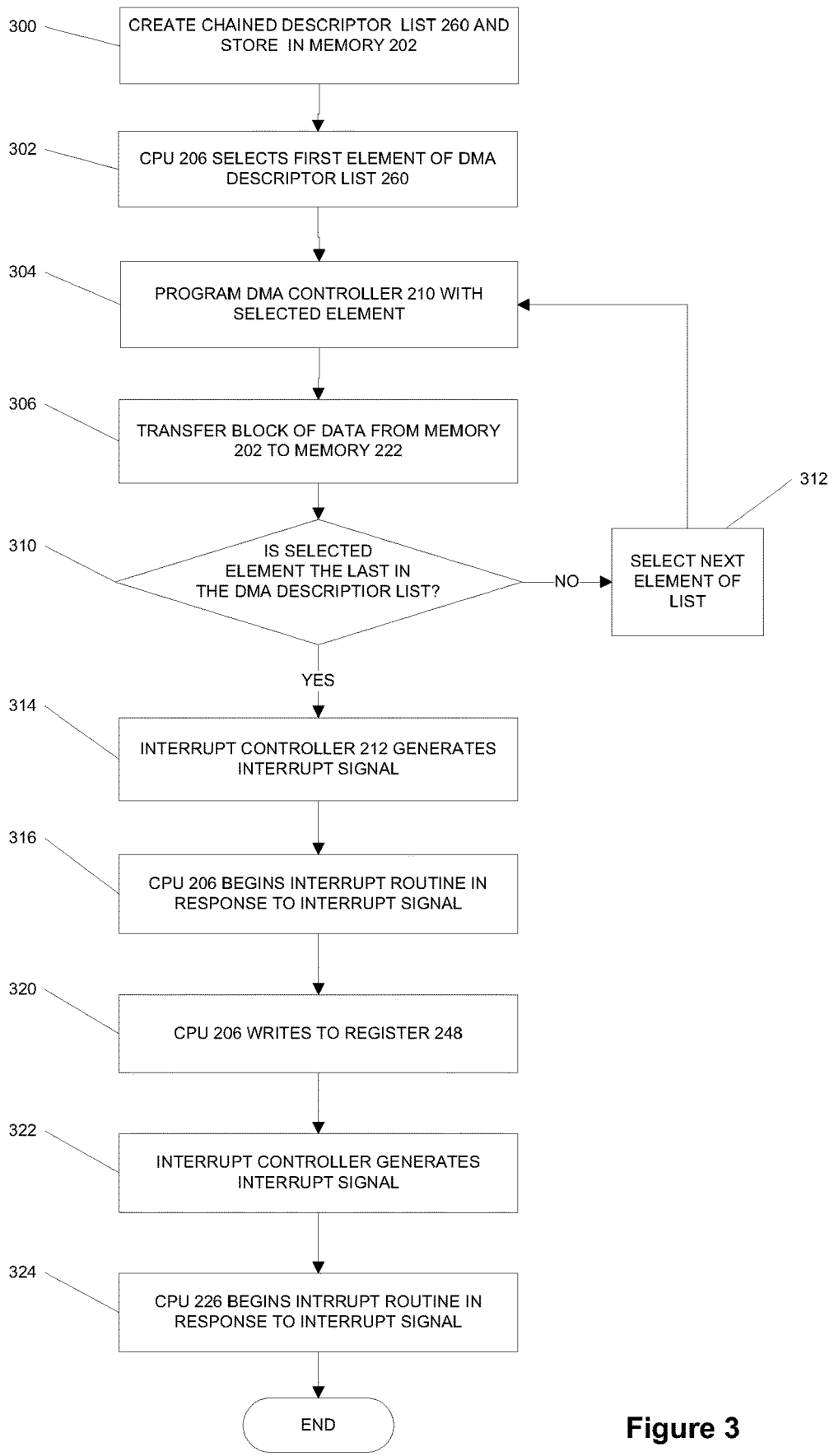
FIG. 3 is a flowchart illustrating relevant aspects of an example DMA transfer.
Figure 4:
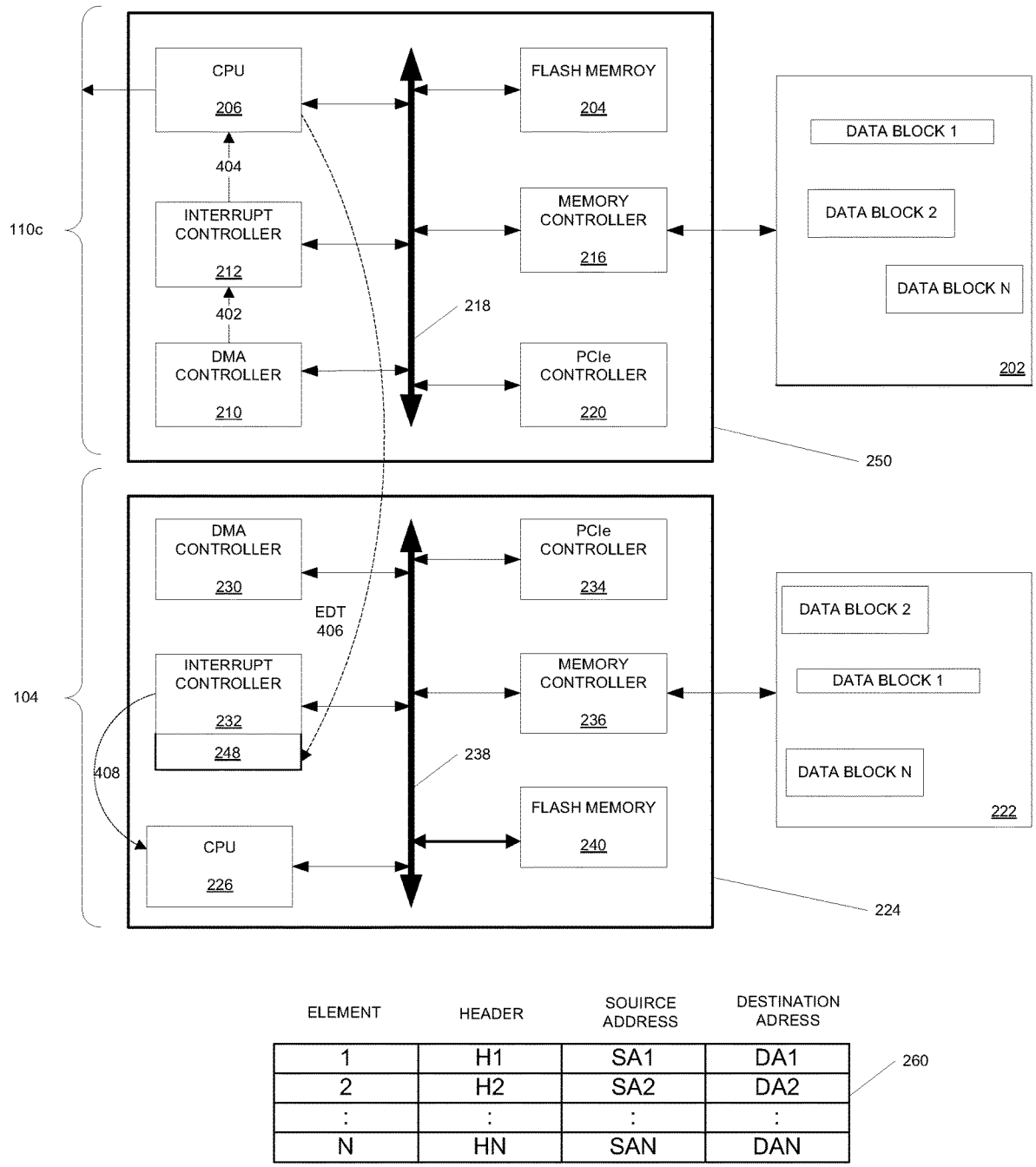
FIG. 4 illustrates the components of FIG. 2 after completion of a DMA transfer.

FIG. 3 is a flowchart illustrating relevant aspects of an example DMA transfer from memory system 202 to memory system 222 via PCIe link 250. The process starts after CPU 206, while executing instructions stored within flash memory 214, generates a DMA descriptor list such as DMA descriptor list 260 shown in FIG. 2. In step 304, the first element of the DMA descriptor list is selected, and the transfer control registers, including source address register, destination address register, block data length register, etc., of the DMA controller 210 are programmed with respective values, including source address SA, destination address DA, block data length, etc., of the selected first element. The transfer control registers can be programmed by the CPU 206 or by the DMA controller 210. For purposes of explanation only, the present disclosure will be described with reference to DMA controller 210 selecting and programming or reprogramming its control registers, it being understood the present invention should not be limited thereto. In this embodiment, there is no involvement CPU 206 during the scatter/gather DMA transfer. Once the control registers are programmed, DMA controller 210 in step 306 transfers data of a corresponding block using consecutive read/write cycles from memory system 202 to memory system 222 via PCIe link 250 and PCIe controllers 220 and 234. During a read portion of the cycle, DMA controller 210 puts a read signal and the source address of its source address register on the control on address buses, respectively, of communication system 218. DMA controller 210 then receives the specified data from memory system 202 via memory controller 216 and communication system 218. This received data is then written to memory system 222 at the destination address corresponding to that in the destination register of DMA controller 210. More particularly, DMA controller 210 places the destination address of its destination register, the data just received, and a write signal on address, data, and control buses, respectively, of communication system 218. PCIe controller 220 receives the data and its destination address, the combination of which is transmitted to PCIe controller 234 via PCI link 250. Before transmission PCIe controller 220 may map the destination address it receives from DMA controller 210 to a corresponding destination address in memory system 222. Eventually, the data transmitted over link 250 is written to system memory 222 at the destination address provided by PCIe controller 220. DMA controller 210 increments the source and destination addresses contained within its source and destination registers, respectively, to generate the next source and destination addresses. DMA controller 210 also increments its byte counter by one. DMA controller 210 compares the byte counter and the block transfer length of the selected DMA descriptor list element. If the value of the byte counter does not equal the block data length, DMA controller 210 repeats the read/write cycle with the next source and destination addresses. Otherwise, the process proceeds to step 310 where a flag in header H of the currently selected element is checked to see whether the selected element is the last in the DMA descriptor list 260. If the selected element is not the last, then the next element of the descriptor list, which is identified by a pointer within header H, is selected, and the data control registers of the DMA controller 210 are reprogrammed as shown step 312. Step 306 is repeated for the next block of data. If, however, in step 310 the selected element is the last of the DMA descriptor list, then the data transfer is complete. FIG. 4 shows the state of system memory 222 after completion of a DMA transfer of the example N blocks from memory 202 to memory 222.

The process of FIG. 3 is not complete. With continuing reference to FIGS. 3 and 4, at step 314 DMA controller 210 sends a signal 402 to interrupt controller 212, which indicates competition of the data transfer. In response, interrupt controller 212 in step 314, generates an interrupt signal 404 for CPU 206. In step 316, CPU 206 begins an interrupt routine that results in CPU 206 writing the "End of DMA Transfer (EDT)" message 406 to the register 248 within interrupt controller 232 via PCIe link 250 and PCI controllers 225 and 234. Interrupt controller 232 detects the newly received EDT message in its register, and accordingly interrupt controller 212 generates a corresponding interrupt signal 408 for CPU 226.

A substantial amount of time and processing bandwidth is needed for CPU 206 to write the End of DMA Transfer (EDT) message 406 to register 428. In one embodiment, an EDT message is a set pattern or value that is unique to any DMA transfer. In another embodiment, EDT messages are set patterns or values that correspond to respective types of DMA transfers. For purposes of explanation only, EDT message 406 corresponds to a scatter/gather DMA transfer. The present disclosure provides an apparatus and method for addressing the time and processing demands that are needed to write the End of DMA Transfer message or similar messages. In one embodiment, DMA controller 210, not CPU 206, can write the EDT message to the appropriate register of interrupt controller 232 or elsewhere as part of the DMA transfer process. The remaining description is dedicated to this concept.

Figure 5:
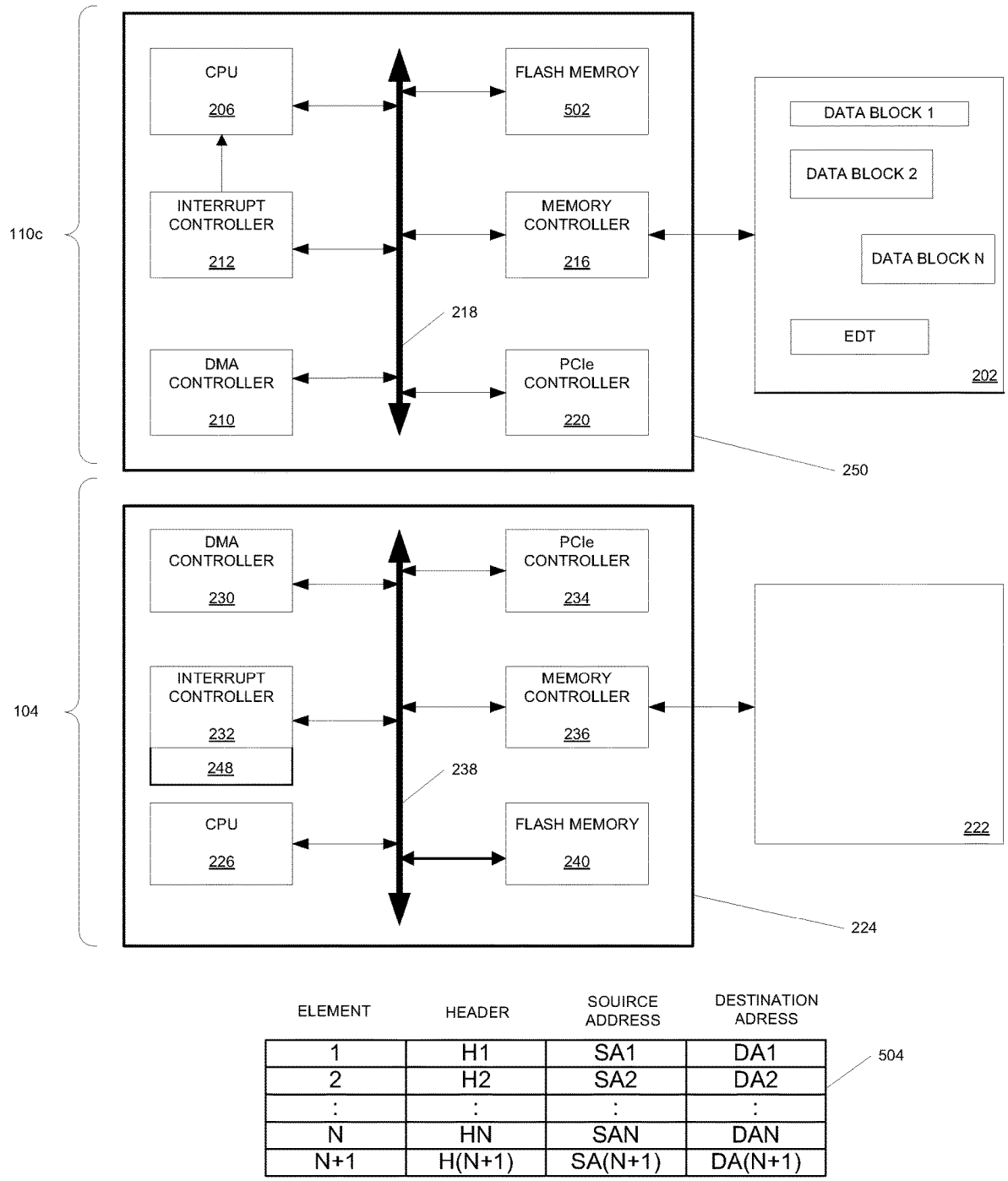
FIG. 5 illustrates relevant components of an example computer system for implementing one embodiment of the present disclosure.

FIG. 5 illustrates an apparatus for implementing one embodiment of the present disclosure. FIG. 5 includes many of the same components shown in FIGS. 2 and 4; but, substantial differences exist. For example, the flash memory of FIG. 5 contains CPU executable instructions that are different from the instructions stored in flash memory 214 of FIGS. 2 and 4. The flash memory of FIG. 5 is designated with a new reference number 502 to emphasize the difference in instructions stored therein. Like the CPU 206 shown in FIGS. 2 and 4, the CPU 206 of FIG. 5, when executing instructions of flash memory 502, generates chained DMA descriptor lists for scatter/gather DMA transfers from memory 202 to memory 222. The DMA description list generated by CPU 206 in FIG. 5, however, is different. More particularly, a DMA descriptor list generated in the embodiment of FIG. 5 includes an additional and last element for transferring a copy of the "End of DMA Transfer" message to register 248 of interrupt controller 232. In one embodiment, the End of DMA Transfer message is transferred from memory 202 to register 248. In this embodiment, the End of DMA Transfer message is stored in memory 202 by CPU 206. This concept is more fully described below. FIG. 5 shows memory 202 in a separate integrated circuit. In an alternative embodiment, memory 202 may be a sub-circuit component of circuit 204.

Figure 6:
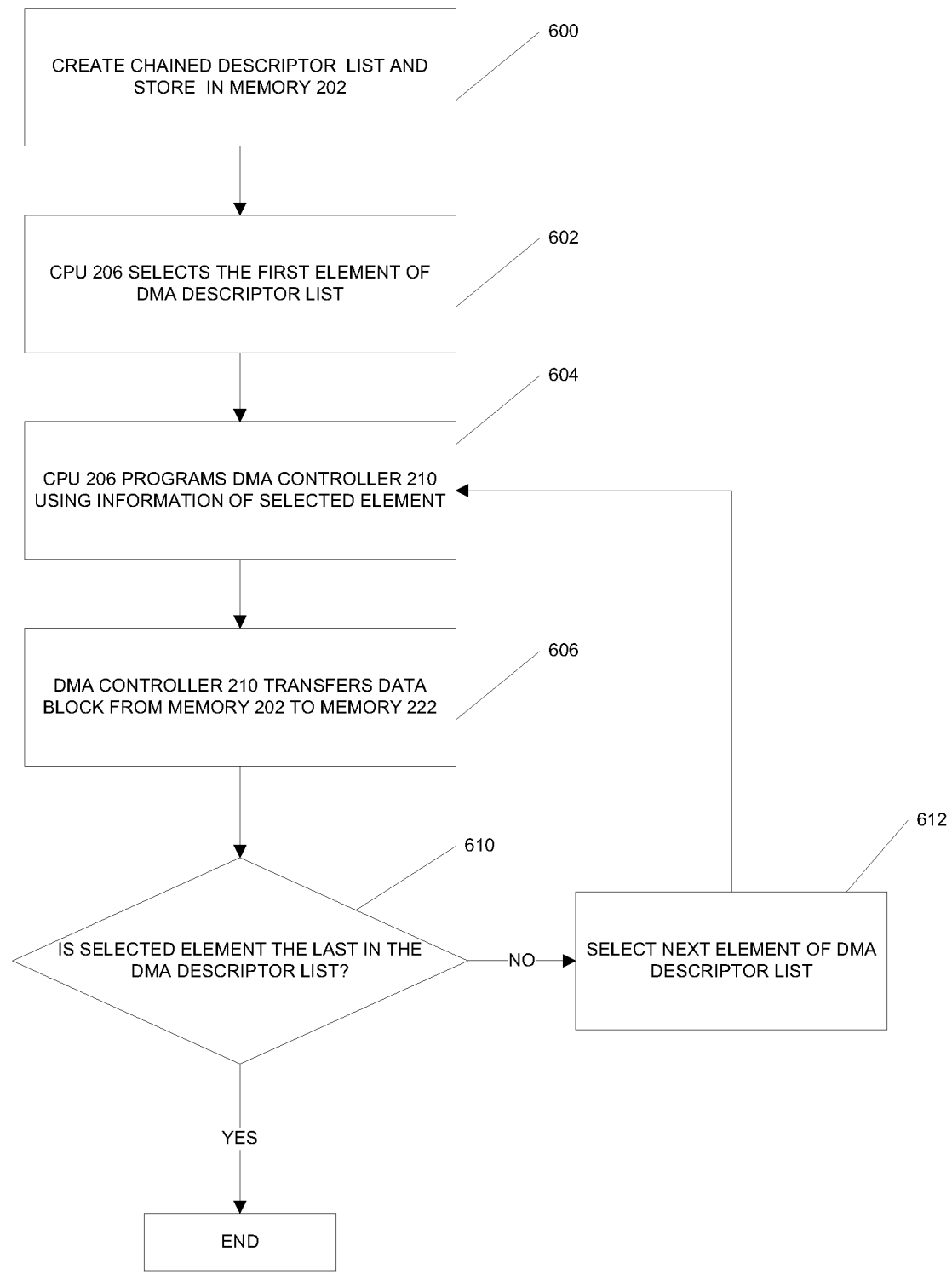
FIG. 6 is a flowchart illustrating a DMA transfer according to one embodiment of the present disclosure.

With continuing reference to FIG. 5, FIG. 6 illustrates a DMA transfer according to one embodiment of the present disclosure. The process starts after CPU 206 creates a chained DMA descriptor list such as DMA descriptor list 504, which includes the additional element (i.e., N+1) mentioned above. For purposes of explanation, the process shown in FIG. 6 will be described with reference to DMA descriptor list 504. After CPU 206 creates DMA descriptor list 504 in accordance with instructions stored in memory 214, in step 604 the first element of the DMA descriptor list is selected, and the transfer control registers, including source address register, destination address register, block data transfer length register, etc., of the DMA controller 210 are programmed with respective values, including source address SA, destination address DA, block data transfer length, etc., of the selected first element. Once the data control registers are programmed, DMA controller 210 in step 606 transfers data of a corresponding block using consecutive read/write cycles from memory system 202 to memory system 222 via PCIe link 250 and PCIe controllers 220 and 234. During a read portion of the cycle, DMA controller 210 puts a read signal and the source address of its source address register on the control on address buses, respectively, of communication system 218. DMA controller 210 then receives the specified data from memory system 202 via memory controller 216 and communication system 218. This received data is then written to memory system 222 at the destination address corresponding to that in the destination register of DMA controller 210. More particularly, DMA controller 210 places the destination address of its destination register, the data just received, and a write signal on address, data, and control buses, respectively, of communication system 218. PCIe controller 220 receives the data and its destination address, the combination of which is transmitted to PCIe controller 234 via PCI link 250. PCIe controller 220 may map the destination address it receives from DMA controller 210 to a corresponding destination address before the data is transmitted to PCIe controller 234. Eventually, the data transmitted over link 250 is written to storage (e.g., memory 222, register 248, etc.) at the destination address. DMA controller 210 increments the source and destination addresses contained within its source and destination registers, respectively, to generate the next source and destination addresses. DMA controller 210 also increments its byte counter by one. DMA controller 210 compares the byte counter and the block data transfer length of the selected DMA descriptor list element. If the value of the byte counter does not equal the block data transfer length, DMA controller 210 repeats the read/write cycle with the incremented source and destination addresses. Otherwise, the process proceeds to step 610 where a flag in header H of the currently selected element is checked to see whether the selected element is the last in the DMA descriptor list 260. If the selected element is not the last, then the next element of the descriptor list, which is identified by a pointer P (e.g., P1) within header H, is selected, and the data control registers of the DMA controller 210 are reprogrammed as shown step 612. Step 604 is repeated for the next block of data. If, however, the selected element is the last (i.e., element N+1) of the DMA descriptor list in step 610, then the data transfer is complete Importantly, the transfer 606 corresponding to the last element in list 610, results in DMA controller 210 copying the End of Data Transfer (EDT) message from memory 202 to register 248.

Figure 7:
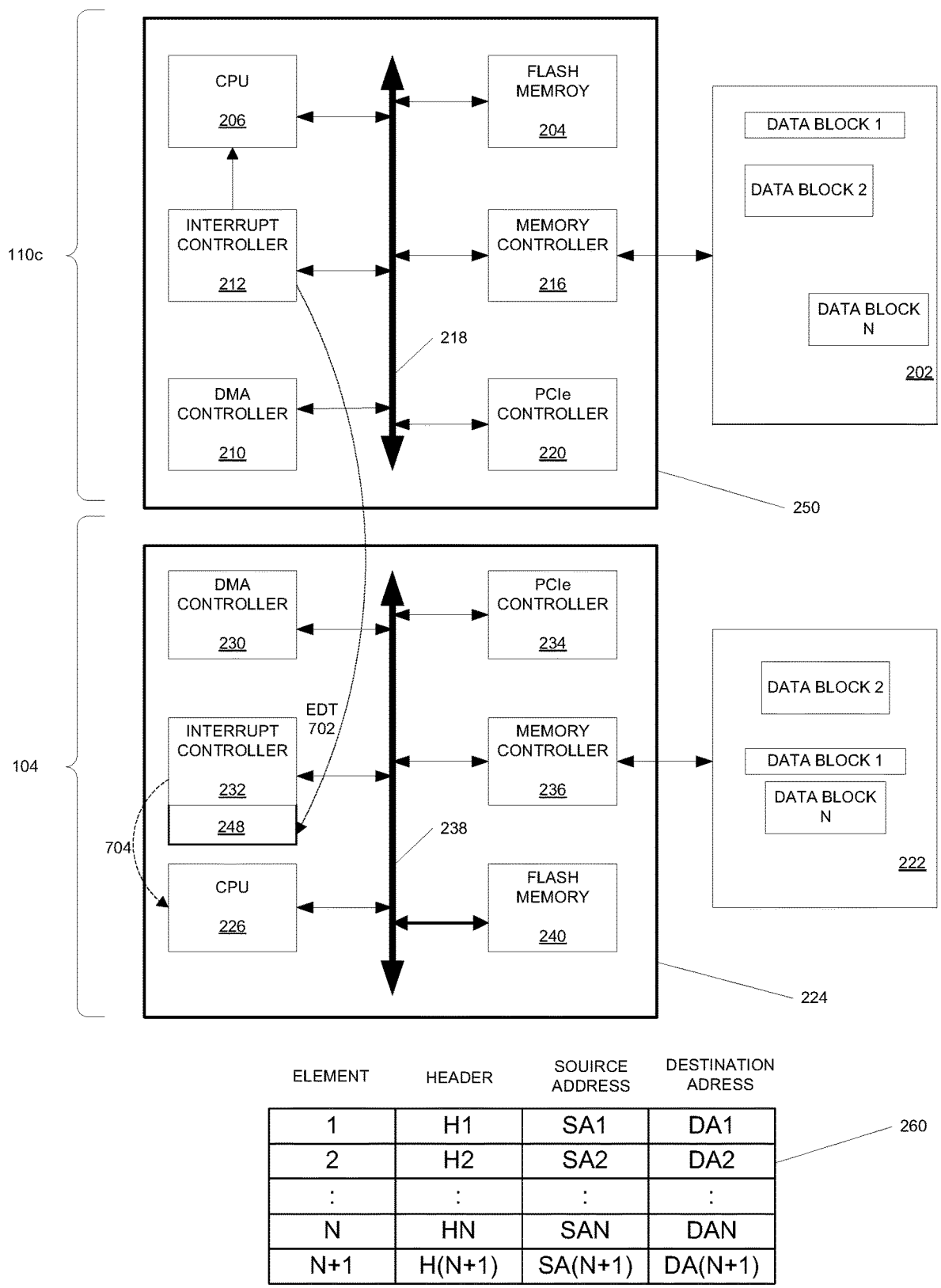
FIG. 7 illustrates the components of FIG. 5 after completion of a DMA transfer according to the process of FIG. 6.

FIG. 7 shows the state of system memory 222 after completion of the DMA transfer, including the DMA transfer 702 of the End of DMA Transfer (EDT) message to register 248. Importantly, CPU 206 is not interrupted to write the End of DMA Transfer message to register 248. Interrupt controller 232 detects the newly received End of DMA Transfer message in register 248, and accordingly interrupt controller 212 generates a corresponding interrupt signal 704 for CPU 226. Because CPU 206 does not write the End of DMA Transfer message to register 248 in the process of FIG. 6, the processing burden on CPU 206 is reduced when compared to the processing burden on CPU 206 as described with reference to FIGS. 3 and 4.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
a first central processing unit (CPU) creating a first data structure that comprises one or more first source addresses mapped to one or more first destination addresses, respectively, and a predetermined source address mapped to a predetermined destination address, wherein the one or more first source addresses correspond to one or more first source locations, respectively, in a first memory system where one or more first data blocks are stored, respectively, and wherein the predetermined source address corresponds to a predetermined source location where a predefined data pattern is stored;
a direct memory access (DMA) controller participating in a DMA data transfer based on the first data structure, wherein the DMA controller is contained in a first circuit, and wherein the DMA data transfer comprises:
sequentially copying the one or more first data blocks to one or more first destination storage locations, respectively, corresponding to the one or more first destination addresses, respectively, wherein the one or more first destination storage locations is located in a second memory system, and;
subsequent to the sequential copying of the one or more first data blocks to the one or more first destination storage locations, copying the predefined data pattern to a predetermined storage location corresponding to the predetermined destination address, the predetermined storage location is a register of an interrupt controller circuit and the predefined data pattern indicates an end of DMA transfer to the interrupt controller circuit.

2. The method of claim 1 wherein the predetermined destination storage location comprises the register associated with the interrupt controller circuit that is external to the first circuit.

3. The method of claim 2 further comprising the interrupt controller circuit detecting the predefined data pattern in the register, and the interrupt controller circuit generating an interrupt signal in response to detecting the predefined data pattern.

4. The method of claim 3 further comprising a second CPU receiving the interrupt signal from the interrupt controller circuit.

5. The method of claim 2 further comprising a second CPU receiving an interrupt signal from the interrupt controller circuit in response to the act of copying the predefined pattern to the register.

6. The method of claim 1 wherein the first CPU is contained in the first circuit, and wherein the one or more first storage locations are external to the first circuit.

7. The method of claim 4 wherein the second CPU is contained in a second and separate circuit.

8. The method of claim 1 further comprising:
the first CPU creating a second data structure that comprises one or more second source addresses mapped to one or more second destination addresses, respectively, and the predetermined source address mapped to the predetermined destination address, wherein the one or more second source addresses correspond to one or more second source locations, respectively, in the memory system where one or more second data blocks are stored, respectively;
the DMA controller participating in another DMA data transfer, wherein the other DMA data transfer comprises:
sequentially copying the one or more second data blocks to one or more second destination storage locations, respectively, corresponding to the one or more second destination addresses, respectively, and;
subsequent to the sequential copying of the one or more second data blocks to the one or more second destination storage locations, copying the predefined data pattern to the predetermined destination storage location corresponding to the predetermined destination address.

9. A method comprising:
a first central processing unit (CPU) writing a predefined data pattern to a predetermined source location;
storing first data blocks at first source locations, respectively, in a first memory system;
after storing the first data blocks at the first source locations, the first CPU creating a first data structure that comprises first source addresses mapped to first destination addresses, respectively, and a predetermined source address mapped to a predetermined destination address, wherein the first source addresses correspond to the first source locations, respectively, and wherein the predetermined source address corresponds to the predetermined source location;
a DMA controller transferring based on the first data structure the data stored at one of the first source locations corresponding to one of the first source addresses wherein the data is transferred to a second memory system;
after the DMA transfer of the data stored at the one of the first source storage locations, based on the first data structure transferring the predefined data pattern by the DMA controller from the predetermined source address to a register of an interrupt controller circuit indicated by the predetermined destination address, the predefined data pattern indicating an end of DMA transfer to the interrupt controller circuit.

10. The method of claim 9 further comprising the interrupt controller circuit detecting the predefined data pattern in the register, and the interrupt controller circuit generating an interrupt signal in response to detecting the predefined data pattern in the register.

11. The method of claim 10 further comprising a second CPU receiving the interrupt signal from the interrupt controller circuit.

12. The method of claim 9 further comprising a second CPU receiving an interrupt signal from the interrupt controller circuit in response to the act of transferring the predefined data pattern to the register.

13. The method of claim 9 wherein the first CPU is contained in a first circuit, and wherein the one or more first storage locations are external to the first circuit.

14. The method of claim 9 further comprising:
storing second data blocks at second source locations, respectively, in the memory system;
after storing the second data blocks at the second source locations, the first CPU creating a second data structure that comprises second source addresses mapped to second destination addresses, respectively, and the predetermined source address mapped to the predetermined destination address, wherein the second source addresses correspond to the second source locations, respectively;

the DMA controller transferring data stored at one of the second source locations corresponding to one of the second source addresses;

after the DMA transfer of the data stored at the one of the second source locations, the DMA controller transferring the predefined data pattern from the predetermined source address to the register.

15. A non-transitory memory for storing instructions, wherein a central processor unit (CPU) implements a method in response to executing the instructions, the method comprising:

writing a predefined data pattern to a predetermined source location;

storing one or more first data blocks at one or more first locations, respectively, in a first memory system before or after the CPU writes the predefined data pattern to the predetermined source location;

after storing the one or more first data blocks at the one or more first source locations, creating a first data structure that comprises one or more first source addresses mapped to one or more first destination addresses, respectively, and a predetermined source address mapped to a predetermined destination address, wherein the one or more first source addresses correspond to the one or more first source locations, respectively, and wherein the predetermined source address corresponds to the predetermined source location;

wherein the first data structure is used by a DMA controller to transfer data stored at the one or more first storage locations to a second memory system and to transfer the predefined data pattern to a register of an interrupt controller circuit indicated by the predetermined destination address, the predefined data pattern indicating an end of DMA transfer to the interrupt controller circuit.

16. The non-transitory memory of claim 15 wherein the method further comprises:

creating a second data structure that comprises one or more second source addresses mapped to one or more second destination addresses, respectively, and the predetermined source address mapped to the predetermined destination address, wherein the one or more second source addresses identify one or more second locations, respectively, in the memory system where one or more second data blocks are stored, respectively;

wherein the second data structure can be used by the DMA controller to transfer data stored at the one or more second storage locations and to transfer the predefined data pattern.

17. The non-transitory memory of claim 15 wherein the predefined data pattern can be used to initiate an interrupt.

18. The method of claim 1, wherein the predefined data pattern is copied to the register of the interrupt controller without the first CPU being interrupted.

* * * * *